April 17, 1956
D. K. JOVANOVICH
2,742,098
MOVEMENT LIMITING MEANS FOR BLADES
OF AIRCRAFT SUSTAINING ROTORS
Filed Oct. 6, 1951
3 Sheets-Sheet 1
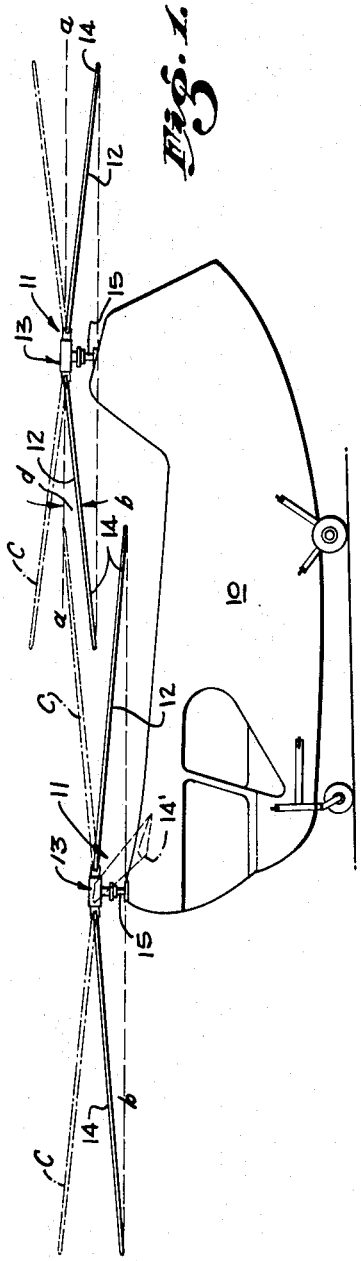
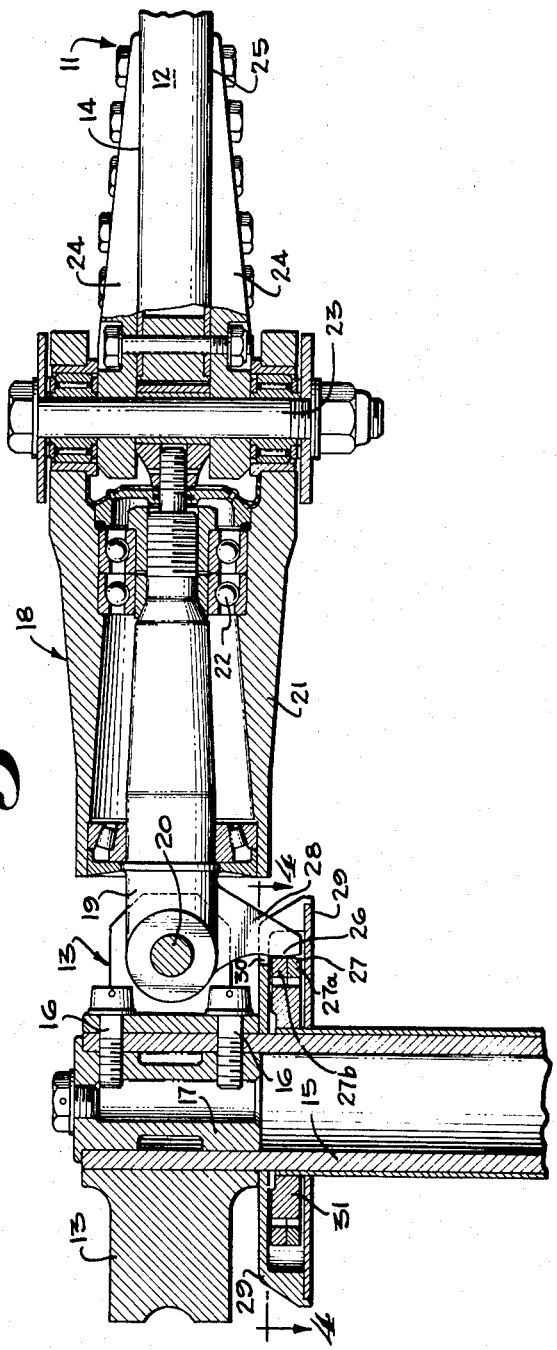
DRAGOLJUB K. JOVANOVICH,
INVENTOR.
BY
ATTORNEY

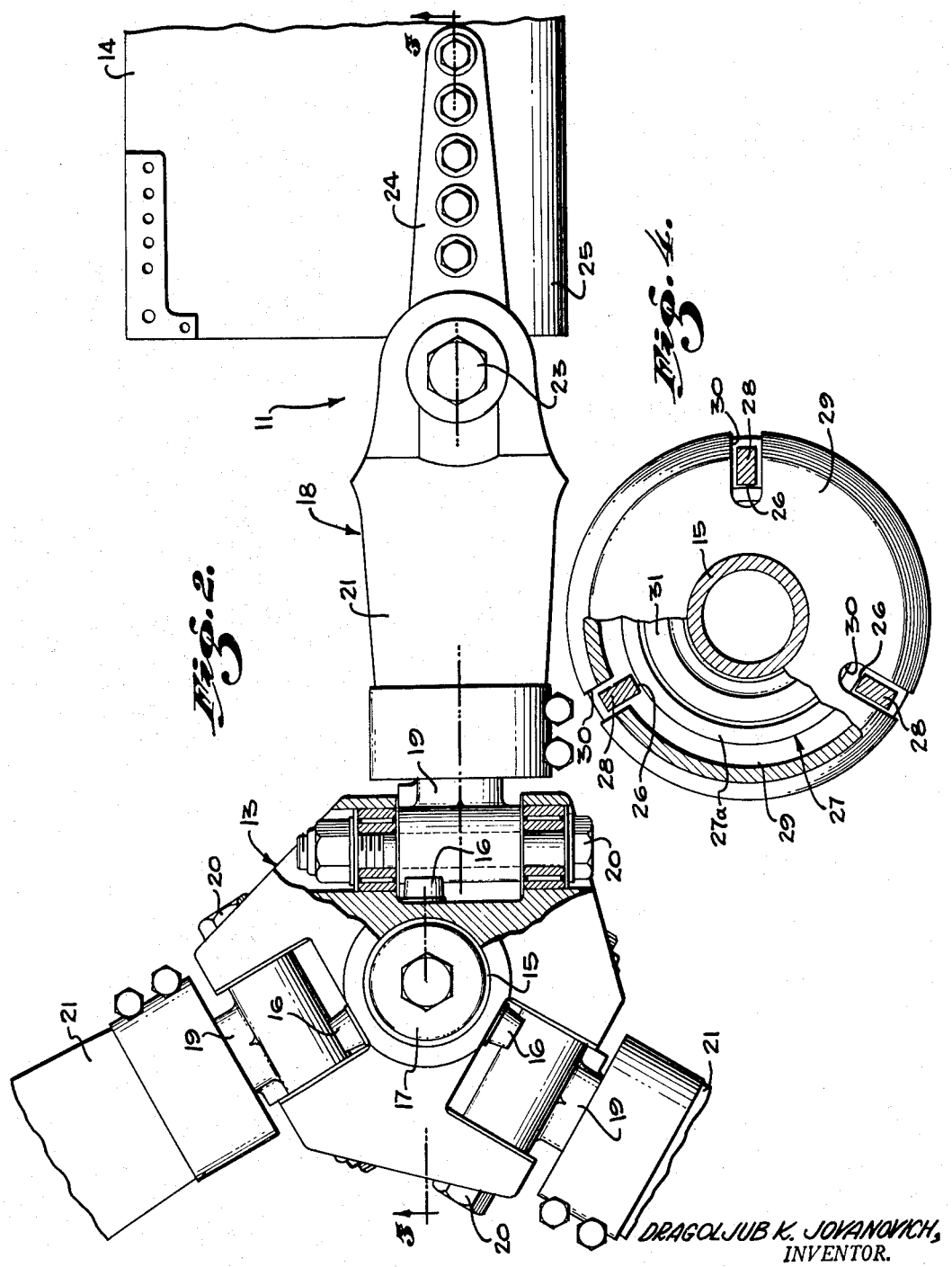

Front

DRAGOLJUB K. JOVANOVICH,
INVENTOR.

BY

ATTORNEY

United States Patent Office 2,742,098
Patented Apr. 17, 1956

2,742,098

MOVEMENT LIMITING MEANS FOR BLADES OF AIRCRAFT SUSTAINING ROTORS

Dragoljub K. Jovanovich, Redondo Beach, Calif., assignor to McCulloch Motors Corporation, Los Angeles, Calif., a corporation of Wisconsin Application October 6, 1951, Serial No. 250,103

7 Claims. (Cl. 170—160.55)

This invention relates to rotatable sustaining means for aircraft and relates in particular to means for limiting the up and down swinging movement of the sustaining rotor blades.

Aircraft of the type employing this invention have one or more sustaining rotors including blades which extend radially and are hinged to a rotor body so as to have, in addition to rotary movement around the axis of the body, an up and down swinging movement. For explanatory purposes, movement of the rotor blade above a plane normal to the rotor body may be referred as the the rise of the blade and the extreme downward swinging movement of the rotor blade may be referred to as the droop of the blade. Also, the angle which the lowered or drooped blade makes with the normal plane may be referred to as the droop angle.

It is an object of the invention to provide a novel means for limiting the fall of the rotor blades, below the normal plane passing through the rotor body, characterized by permitting a greater droop of the rotor blades when they are revolving with the rotor head than normally when the blades are stationary.

It is an object of the invention to provide a means for varying the permissible blade droop angle regardless whether the articulated blades are at rest or rotating around the axis of the rotor body. In the invention, when the blades are at rest, the droop angle is the same for all blades, but when the sustaining rotors are being operated during extreme maneuver an increase in the droop angle is permitted for the blades while they are passing through a portion of the circular movement which they have about the axis of the rotor body. It is characteristic of articulated sustaining blades while they are in operation to swing below the normal plane on one side of their circle of revolution about the axis of rotation and to rise above the normal plane on the opposite side of such circle of revolution. This is sometimes referred to as a flapping action of the blades. The invention is especially useful in sustaining rotors having cyclic pitch control, as it permits increased blade droop when cyclic pitch control produces increased droop of the blades on one side of the rotor.

It is an object of the invention to provide a sustaining rotor such as described in the preceding paragraph having shoulders on the blade structures and means of engagement between such shoulders for normally limiting the droop angle when the blades are at rest, but permitting an increase in the droop angle when the blades are rotating, and also to permit a greater droop angle at the front than at the rear of the rotor.

A further object of the invention is to provide a sustaining rotor of this type having projecting levers on the rotor structures which have shoulders for engagement with the engagement means.

A further object of the invention is to provide in a sustaining rotor, an engagement means for the purpose set forth consisting of a ring arranged to shift laterally.

A further object of the invention is to provide a stop for limiting the lateral shifting movement of the ring which constitutes the engagement means, thereby limiting the maximum droop angle which may be assumed by any of the rotor blades, this stop being arranged in one form of the invention to limit the movement of the ring to a greater extent in one direction than in other directions.

Further objects of the invention will be brought out in the following part of the specification, wherein a preferred embodiment of the invetnion has been described in detail for the purpose of disclosure, without limiting the scope of the invention set forth in the appended claims nor limiting the range of equivalents to which the claims are entitled.

Referring ot the drawings which are for illustrative purposes only:

Fig. 1 is an elevational view showing a helicopter with rotors of my invention thereon;

Fig. 2 is a plan view, to enlarged scale, of one of the rotor bodies, with portions of blade structures extending therefrom, the outer ends of the blades being omitted;

Fig. 3 is a sectional view taken as indicated on the line 3—3 of Fig. 2;

Fig. 4 is a fragmentary sectional view taken on line 4—4 of Fig. 3;

Figure 5:
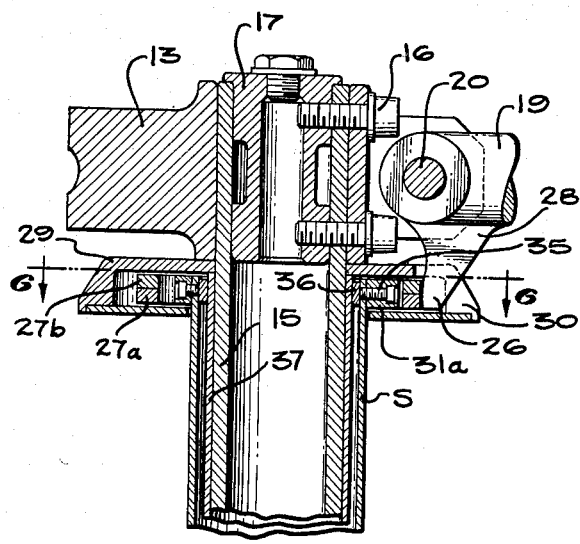
Fig. 5 is a fragmentary section corresponding to the leftward portion of Fig. 3 and showing the form of the invention with stop means arranged to permit a greater droop of the blades at the front of the rotor.

In Fig. 1, I show a helicopter 10 of tandem type having fore and aft sustaining rotors 11. The helicopter 10 is shown standing upon the ground and the sustaining rotors 11 thereof are at rest, with the blade structures 12 sloping downwardly from the rotor bodies 13 thereof. The blade structures 12 are in drooping position and all of the blade structures 12 slope downwardly at a droop angle $d$ with relation to a normal plane $a$—$a$ passing through a rotor body 13.

It will be perceived that the ends of the blades 14 which form parts of the blade structures 12 define a horizontal plane $b$—$b$, when the sustaining rotors 11 are at rest. My present invention permits movement of the rotor structures 12 at certain times so that the ends of the blades at these times may pass below the plane $b$—$b$, as indicated by the dotted lines 14' in Fig. 1.

In Figs. 2 and 3, I show the essential details of my present invention, omitting parts which are employed for control of the positions of the wing members, since these controls form no part of the present invention and may be formed in a number of different ways. The rotor body 13 is fixed on the upper end of an upright shaft 15. The shaft 15 is hollow and securing screws 16 for the rotor body 13 are passed therethrough and are threaded into an insert 17.

Each blade structure 12 comprises a blade member 14 and connecting means 18 for connecting the blade member 14 to the rotor body 13. The connecting means 18 includes a stub shaft 19, the inner end of which is connected by means of a pin 20 to the rotor body 13 so that it will swing up and down, and a sleeve 21 supported by bearings 22 so that it may have rotary movement on the axis of the stub shaft 19, to enable pitch adjustment of the wing member 14. The sleeve 21 is connected by means of a pin 23, which lies substantially in a vertical plane, and attachment plates 24 with the inner end 25 of the wing member 14.

The blade structures 12 have thereon shoulders 26 and means of engagement 27 disposed so as to engage the shoulders 26 and having the function of limiting the droop angle d, Fig. 1, of the blade structures 12 when they are at rest, and having the further function of permitting an increase in the droop angle d as the sustaining rotor 11 revolves during certain maneuvers, for example, during horizontal movement of the craft in the air either forwardly or laterally, or turning.

The shoulders 26 are formed on the lower portions of levers 28 which project downwardly from the inner ends of the stub shafts 19, the shoulders 26 being positioned substantially vertically below the pins 20 so that as the wing structures swing down and up, the shoulders 26 will move in and out. The engagement means 27 comprises rings 27a and 27b supported within a flat annular housing 29 mounted concentrically upon the shaft 15 immediately below the rotor body 13. The housing 29 has therein radial slots 30 in which the lower ends of the levers 28 may move as the blade structures swing up and down. The rings 27a and 27b may move laterally in all directions within the housing 29, the movement thereof in lateral direction is free or unrestrained within the limits set by a stop ring 31 disposed within the housing 29 and within the rings 27a and 27b.

When the sustaining rotor 11 is at rest, as shown in Fig. 3, the blade structures 12 swing down until the shoulders 26 engage the circumferential surface of the rings 27a and 27b, and due to the substantially equal weight of the blade structure 12 they will be balanced, with the rings 27a and 27b disposed concentrically of the shaft 15 and equally spaced from the peripheral surface of the stop ring 31.

During substantially vertical ascent, descent, and hovering of the helicopter, the blade structures will swing upwardly from the positions in which they are shown in full lines in Fig. 1 to coning positions such as shown by the dotted lines c. At this time the blades 14 are disposed at substantially equal angles relative to normal planes passing through the rotor body 13. However, when the helicopter is in extreme lateral maneuver, that is, to say moving forwardly, rearwardly or sidewardly; the virtual axis of the "cone" will incline from the vertical. Due to different relative air speeds and pitch control of the blades 14, the blades 14 will rise on one side of the center of rotation of the sustaining rotor and will droop on opposite side. At this time the engagement means 27 may shift laterally so that the shoulder 26 of the drooping wing structure 12 may swing further toward the axis of the shaft 15 than the positions of such shoulders 26 shown in Fig. 3. This will permit an increase in the droop of the drooping blade so that the outer end thereof may pass below the plane b—b, Fig. 1, as indicated at 14'. When the engagement means 27 comes into engagement with the stop ring 31 further inward movement of the shoulder 26 will be prevented and therefore maximum droop of a wing during maneuver is limited by the stop ring 31. The engagement means 27 is annular, but is is made up of two rings 27a and 27b so that in the event one of the rings fails, the remaining ring will function as the engagement means to control the droop of the blade structures under conditions of rest and flight as previously described.

Figure 6:
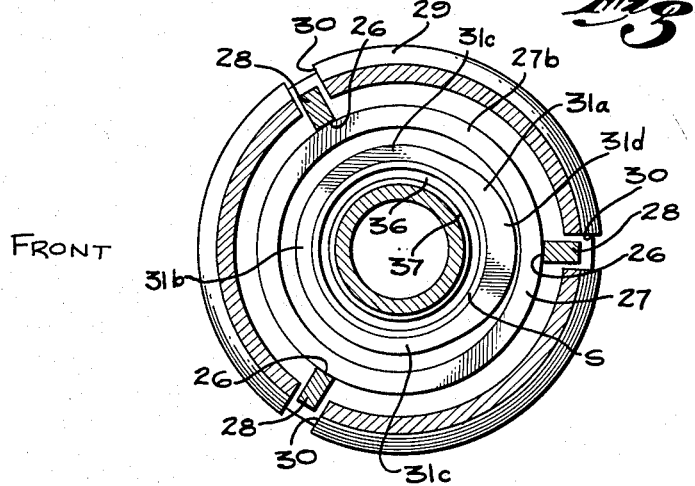
Fig. 6 is a sectional view taken as indicated by the line 6—6 of Fig. 5.

In the form of the invention shown in Figs. 2 to 4 inclusive, the stop ring 31 rotates with the shaft 15, and the outer face thereof is concentric to the axis of rotation of the shaft 15. In the form of the invention indicated in Figs. 5 and 6, a stationary, eccentric stop ring 31a is employed and a stationary tube or sleeve s is provided for the support of the stationary stop ring 31a which is secured to the upper end of the sleeve s by screws 35 and is spaced by an annular bearing 36 from a sleeve 37 which is fixed on the shaft 15. In other respects this form of the invention is essentially as shown and described with relation to Figs. 2 to 4. It includes the shaft 15, a rotor body 13 connected to the upper end of the shaft 15 by screws 16 which are threaded into an insert 17 in the upper end of the shaft 15. The rotor body 13 has horizontal pivot means shown as bolts 20 for supporting the shafts 19 which constitute the inner ends of the means for connecting the blades 14 of the sustaining rotor. As shown in Figs. 5 and 6, there is a housing 29 which rotates with the shaft 15 and encloses the stop ring 31a and also the rings 27a and 27b, there being notches or slots 30 in the housing 29 to receive the shoulders 26 of levers 28 which project downwardly from the inner ends of the shafts 19. Although Fig. 5 shows only one of the shafts 19 with its downwardly projecting lever 28 and shoulder 26, it will be understood that the number of these parts corresponds to the number of blades 14 employed in the sustaining rotor.

In keeping with the position in which the helicopter has been shown in Fig. 1, the left-hand side of the structure shown in Figs. 5 and 6 is regarded as being the front. The front portion 31b of the stop ring 31a is of the same radial thickness as the side portions 31c thereof but the rear portion 31d of the stop ring 31a is of increased radial thickness so as to provide a lobe to limit leftward movement of the rings 27a and 27b. The lobe or thickened portion 31d of the stop ring 31a remains fixed in view of the fact that the stop ring 31a is stationary. The ring 31a limits the lateral movements of the rings 27a and 27b in such a way that blade droop cannot exceed a limited angle, for example, 3° at the rear of the rotor body; whereas it can attain a larger angle, for example 10°, at the front and two sides. The rotor blades may swing down to the larger angle in the front for high forward speeds and may also swing down to this larger angle at the sides during extreme lateral maneuver, but the blades cannot strike the fuselage of the helicopter.

I claim:

1. In sustaining means for aircraft: a rotor body and means for connecting it to an aircraft; a plurality of blade structures extending radially from said rotor body, each of said blade structures comprising a blade member and means for connecting said blade member to said body, said means enabling up and down swinging movement of said blade member; a lever extending from each of said blade structures; a ring disposed around the axis of rotation of said rotor body and so as to be engaged by said levers when said blade structures are at rest, said ring thereby limiting the droop angle of said blades when they are at rest; means supporting said ring for free limited lateral movement across said axis so that during a flight said blade structures may consecutively swing below the positions they are caused to assume by said ring when the blades are at rest; and stop means disposed in the path of travel of said ring so as to limit the lateral movement of said ring and thereby limit the maximum extent to which said blade structure may droop.

2. In sustaining means for aircraft: a rotor body and means for connecting it to an aircraft; a plurality of blade structures extending radially from said rotor body, each of said blade structures comprising a blade member and means for connecting said blade members to said body, said means enabling up and down swinging movement of said blade member; engagement means between said blade structures arranged in a plane crossing the axis of rotation of said rotor body and so as to limit the droop angle of said blades when the blades are at rest; means supporting said engagement means for movement in said plane so as to enable an increase in the droop angle of one of said blades when another of said blades is raised during revolution of said body and said blades; and stop means disposed in the path of travel of said engagement means so as to limit the lateral movement of said engagement means in one direction so as to limit the maximum droop of the blades to a different extent on a selected side of the circle of rotation of said blades.

3. In sustaining means for aircraft: a rotor body and means for connecting it to an aircraft; a plurality of blade structures extending radially from said rotor body, each of said blade structures comprising a blade member and means for connecting said blade member to said body, said means enabling up and down swinging movement of said blade member; a lever extending from each of said blade structures along a line crossing the axes of said blade structure; a ring disposed in a plane crossing the axis of rotation of said rotor body and in the path of travel of the ends of said levers so as to be engaged at angularly spaced points by the ends of said levers when said blade structures are at rest, said ring thereby limiting the droop angle of said blades when they are at rest; means arranged to support said ring for lateral movement, so that during a flight said blades may consecutively swing below the positions they are caused to assume by said ring when the blades are at rest; and a stop ring disposed so as to limit the lateral movement of said first named ring, said stop ring being eccentric to the axis of rotation of the rotor body so as to limit the movement of said first named ring in one of its directions.

4. In sustaining means for aircraft: a rotor body and means for connecting it to an aircraft; a plurality of blade structures extending radially from said rotor body, each of said blade structures comprising a blade member and means for connecting said blade member to said body, said means enabling up and down swinging movement of said blade member; a lever extending from each of said blade structures; a ring disposed in a plane crossing the axis of rotation of said rotor body and in the path of travel of said levers so as to be engaged at angularly spaced points by said levers when said blade structures are at rest, said ring thereby limiting the droop angle of said blades when they are at rest; means arranged to support said ring for lateral movement so that during a flight said blades may consecutively swing below the positions they are caused to assume by said ring when the blades are at rest; and a stop ring disposed so as to limit the lateral movement of said first named ring, said stop ring having an enlarged portion at a side thereof for effecting a restriction of the lateral movement of said ring in a selected direction.

5. In sustaining means for aircraft: a rotor body and means for connecting it to an aircraft; a plurality of blade structures extending radially from said rotor body, each of said blade structures comprising a blade member and means for connecting said blade member to said body, said means enabling up and down swinging movement of said blade member; a lever extending from each of said blade structures; a ring disposed in a plane crossing the axis of rotation of said rotor body and in the path of travel of said levers so as to be engaged at angularly spaced points by said levers when said blade structures are at rest, said ring thereby limiting the droop angle of said blades when they are at rest; means arranged to support said ring for lateral movement so that during a flight said blades may consecutively swing below the positions they are caused to assume by said ring when the blades are at rest; and a stop ring disposed so as to limit the lateral movement of said first named ring, said stop ring having an enlarged portion at a side thereof for effecting a restriction of the lateral movement of said ring in forward direction with respect to the movement of said aircraft.

6. In sustaining means for aircraft: a rotor body and means for connecting it to an aircraft; a plurality of blade structures extending radially from said rotor body, each of said blade structures comprising a blade member and pivot means for connecting said blade member to said body, said pivot means enabling up and down swinging movement of said blade structure; and droop controlling means between said blade structures, said droop controlling means comprising levers extending from said blade structures, means bodily shiftable in a plane transverse to the axis of rotation of said rotor body and engaging said levers so that forces incurred in said blades when they tend to move downwardly will be transmitted to said transversely movable means in opposing relation, and means supporting said bodily shiftable means for free transverse movement.

7. In sustaining means for aircraft: a rotor body and means for connecting it to an aircraft; a plurality of blade structures extending radially from said rotor body, each of said blade structures comprising a blade member and means for connecting said blade member to said body, said means enabling up and down swinging movement of said blade member; a laterally shiftable means surrounding the axis of rotation of said rotor body; a lever extending from each of said blade structures, said levers being arranged so as to engage angularly spaced points of said laterally shiftable means and by engagement with said means limiting the droop of said blade structures when they are at rest; and means supporting said laterally shiftable means for lateral movement so that during flight said blades may consecutively swing below the positions they are caused to assume by said ring when the blades are at rest.

References Cited in the file of this patent

UNITED STATES PATENTS 2,493,869  Hafner _____ Jan. 10, 1950

FOREIGN PATENTS 487,811  Great Britain _____ June 27, 1938